United States Patent
Thompson et al.

(10) Patent No.: US 8,204,891 B2
(45) Date of Patent: Jun. 19, 2012

(54) METHOD AND SUBSYSTEM FOR SEARCHING MEDIA CONTENT WITHIN A CONTENT-SEARCH-SERVICE SYSTEM

(75) Inventors: Jonathan Thompson, Seattle, WA (US); Vijay Chemburkar, Seattle, WA (US); David Bargeron, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 406 days.

(21) Appl. No.: 12/077,590

(22) Filed: Mar. 19, 2008

(65) Prior Publication Data
US 2009/0083256 A1 Mar. 26, 2009

Related U.S. Application Data

(63) Continuation-in-part of application No. 11/903,279, filed on Sep. 21, 2007.

(51) Int. Cl.
*G06F 17/30* (2006.01)
*G06K 9/54* (2006.01)

(52) U.S. Cl. ........................ 707/749; 382/305
(58) Field of Classification Search .................. None
See application file for complete search history.

(56) References Cited

U.S. PATENT DOCUMENTS

| | | | |
|---|---|---|---|
| 6,070,158 A * | 5/2000 | Kirsch et al. ........................ | 1/1 |
| 6,192,360 B1 | 2/2001 | Dumais et al. | |
| 6,553,365 B1 | 4/2003 | Summerlin et al. | |
| 6,636,238 B1 | 10/2003 | Amir et al. | |
| 6,665,640 B1 | 12/2003 | Bennett et al. | |
| 6,675,159 B1 | 1/2004 | Lin et al. | |
| 6,877,002 B2 | 4/2005 | Prince | |
| 6,901,398 B1 | 5/2005 | Horvitz et al. | |
| 7,185,008 B2 | 2/2007 | Kawatani | |
| 7,257,577 B2 | 8/2007 | Fagin et al. | |
| 7,519,565 B2 | 4/2009 | Prakash et al. | |
| 7,542,969 B1 * | 6/2009 | Rappaport et al. .................... | 1/1 |
| 7,673,234 B2 | 3/2010 | Kao et al. | |
| 7,743,061 B2 | 6/2010 | Jones et al. | |
| 7,917,492 B2 | 3/2011 | Bargeron et al. | |

(Continued)

FOREIGN PATENT DOCUMENTS
KR 20030014804 2/2003

OTHER PUBLICATIONS

U.S. Appl. No. 11/903,279, Office Action dated Jul. 29, 2010, 9 pages.

(Continued)

*Primary Examiner* — Tarek Chbouki
(74) *Attorney, Agent, or Firm* — Kilpatrick Townsend & Stockton LLP

(57) ABSTRACT

Various embodiments of the present invention include concept-service components of content-search-service systems which employ ontologies and vocabularies prepared for particular categories of content at particular times in order to score transcripts prepared from content items to enable a search-service component of a content-search-service system to assign estimates of the relatedness of portions of a content item to search criteria in order to render search results to clients of the content-search-service system. The concept-service component processes a search request to generate lists of related terms, and then employs the lists of related terms to process transcripts in order to score transcripts based on information contained in the ontologies.

20 Claims, 16 Drawing Sheets

U.S. PATENT DOCUMENTS

| | | | |
|---|---|---|---|
| 2002/0022956 A1 | 2/2002 | Ukrainczyk et al. | |
| 2003/0037073 A1 | 2/2003 | Tokuda et al. | |
| 2004/0102958 A1 | 5/2004 | Anderson | |
| 2004/0186743 A1* | 9/2004 | Cordero, Jr. | 705/1 |
| 2005/0004897 A1 | 1/2005 | Lipson et al. | |
| 2005/0022106 A1 | 1/2005 | Kawai | |
| 2005/0028194 A1* | 2/2005 | Elenbaas et al. | 725/32 |
| 2005/0222975 A1 | 10/2005 | Nayak et al. | |
| 2005/0246739 A1* | 11/2005 | Davidson | 725/45 |
| 2005/0262050 A1 | 11/2005 | Fagin et al. | |
| 2006/0031217 A1 | 2/2006 | Smith et al. | |
| 2006/0047632 A1 | 3/2006 | Zhang | |
| 2006/0155693 A1* | 7/2006 | Chowdhury et al. | 707/4 |
| 2006/0248458 A1* | 11/2006 | Li | 715/700 |
| 2006/0288015 A1 | 12/2006 | Schirripa et al. | |
| 2008/0077583 A1 | 3/2008 | Castro et al. | |
| 2008/0126319 A1 | 5/2008 | Bukai et al. | |
| 2009/0083257 A1 | 3/2009 | Bargeron et al. | |
| 2009/0174526 A1 | 7/2009 | Howard et al. | |

OTHER PUBLICATIONS

U.S. Appl. No. 11/903,279, Final Office Action dated Jan. 11, 2011, 12 pages.

U.S. Appl. No. 12/077,591, Notice of Allowance dated Nov. 24, 2010, 20 pages.

* cited by examiner

|   | to | from | metric |
|---|----|------|--------|
| 0 | 4 | 6 | 0.61 |
| 1 | 4 | 18 | 0.32 |
| 2 | 4 | 861 | 0.21 |
|   | 4 | 416 | 0.22 |
|   | 4 | 200 | 0.47 |
|   | 7 | 500 | 0.16 |
|   | 7 | 10 | 0.19 |
|   | 7 | 26 | 0.52 |
|   | 9 | 361 | 0.41 |
|   | 9 | 550 | 0.18 |
|   | 9 | 200 | 0.67 |
|   | 9 | 17 | 0.73 |
|   | 9 | 36 | 0.21 |
|   | 9 | 411 | 0.30 |
|   | 10 | 107 | 0.15 |
|   | 10 | 263 | 0.91 |
|   | 11 | 313 | 0.27 |
|   | 11 | 802 | 0.25 |
|   | 11 | 761 | 0.16 |
|   | 11 | 660 | 0.77 |
|   | 11 | 25 | 0.31 |
|   | 16 | 81 | 0.23 |
|   | 16 | 393 | 0.22 |
|   | 21 | 13 | 0.18 |
|   | 21 | 18 | 0.55 |
|   | 21 | 441 | 0.16 |
|   | 21 | 302 | 0.43 |
|   | 1621 | 961 | 0.30 |
| up to $m$-1 | 1621 | 877 | 0.35 | ontology

Figure 8

|   | 908 | 910 | 904 | 905 | 906 |   |
|---|---|---|---|---|---|---|
| 0 | 4 | 6 | 1876 | 2036 | 16781 |   |
| 1 |   |   |   |   |   |   |
| 2 |   |   |   |   |   |   |
| 3 |   |   |   |   |   |   |

| 1102 | 1104 |
|---|---|
| 161 | 0.5 | ← 1106
| 13 | 1.5 |
| 87 | 3.25 |
| 14 | 4.0 |
| 15 | 4.25 |
| 19 | 5.25 |
| 361 | 6.25 |
| . | . |
| . | . |
| . | . |

Figure 11

| 161 | 0.5 | .36 | ← 1304 |
|-----|------|-----|---|
| 87  | 3.25 | .87 |   |
| 19  | 5.25 | .12 |   |
| .   | .    | .   |   |
| .   | .    | .   |   |
| .   | .    | .   | ~ 1302 |
| .   | .    | .   |   |
|     |      |     |   |
|     |      |     |   |
|     |      |     |   |
|     |      |     |   |
|     |      |     |   |
|     |      |     |   |
|     |      |     |   |
|     |      |     |   |
|     |      |     |   |
|     |      |     |   |
|     |      |     |   |

Figure 13

METHOD AND SUBSYSTEM FOR SEARCHING MEDIA CONTENT WITHIN A CONTENT-SEARCH-SERVICE SYSTEM

CROSS-REFERENCE TO RELATED APPLICATION

This application is a continuation-in-part of application Ser. No. 11/903,279, filed Sep. 21, 2007.

TECHNICAL FIELD

The current invention is related to searching media content, including video files with audio tracks, audio tracks, and other types of media content that include data that can be fully or partially transcribed to produce a text transcript, to identify portions of the media content related to search-query terms and phrases, and, in particular, to a concept-service component of a content-search-service system that employs an ontology and a text transcript to score the transcript for use by a search-service component of the content-search-service to render search results to a client of the content-search-service system.

BACKGROUND OF THE INVENTION

In the early days of computing, information was generally encoded as formatted alphanumeric character strings or as unformatted ordered sequences of information-storage units, typically bytes. As computing hardware, operating systems, and computer applications have together evolved, many different types of information encodings have been developed, and a very large variety of different types of information are now routinely electronically encoded, stored, exchanged, and rendered for access by users, including text files, specially formatted application-specific files, audio recordings, video recordings, and multimedia presentations. While, in early days of computing, data was primarily rendered as character strings displayed on monochromatic, 24-line terminals, the many different types of information currently electronically encoded and distributed by computer systems are rendered for presentation to human users by a variety of different application programs, including text and image editors, video players, audio players, and web browsers.

An important class of information comprises information encoded as an ordered sequence of information units that are sequentially rendered for display or presentation to a human user. An MPEG-encoded video file is one example of a sequentially ordered information encoding. MPEG encoding employs a number of rather complex layers of different types of encoding methods to compactly encode a video stream and/or audio stream. In general, video frames are reconstructed from an MPEG-encoded video file frame-by-frame, in sequence. Rendering of an MPEG-encoded video file provides a stream of video frames and an audio stream. Rendering applications and devices generally allow a user to start or resume rendering of the video file, to stop rendering of the video file, and to skip forward or backward to selected positions within a video stream.

In many cases, a user may only be interested in a certain portion of a video presentation. For example, a particular user may be interested only in a weather report included in a local television news broadcast that includes reviews of current local and national events, reviews of sporting events, and presentations of human-interest stories in addition to the weather report. In many cases, video presentations may not be indexed by sections, in order to facilitate direct access to portions of the video presentation of interest to a user, or may be indexed at a very coarse topic granularity, requiring a user to employ a hit-or-miss strategy of starting, stopping, advancing, and reversing the video stream by relatively crude techniques in order to locate portions of interest. In addition to encoded video, there are many other types of sequentially ordered information encodings that are sequentially rendered for human perception, including pure audio recordings, various types of multimedia presentations, images of pages within books and text documents, and other such information encodings. In many cases, searching for portions of the encoded information of interest to human users is currently limited to the above-described stop/start/advance/and reverse operations familiar to users of video-rendering applications and many video-signal-rendering devices.

Designers and manufacturers of computers and other electronic devices that render sequentially ordered information encodings for presentation to human users, designers, implementers, vendors and users of information-rendering applications, including media players, web browsers, and control programs, and many others involved in recording, disseminating, and rendering information have recognized the need for more effective searching tools to allow users to identify and efficiently access portions of an information encoding of interest to those to whom the information is rendered. In response to these needs, a content-search-service system has been developed. Various embodiments of the present invention comprise components and subsystems of this content-search-service system. The content-search-service system receives and/or locates and retrieves various content items electronically available to clients of the content-search-service system and prepares internal representations of the content items, or portions of the content items, to enable the content-search-service to graphically render search results generated by the content-search-service system in response to search requests made by clients of the content-search-service system. Designers, developers, and manufacturers of content-search-service systems, as well as content-search-service providers and users of content-search-service systems and services provided by content-search services, have all recognized the need for efficient and accurate content-search-service components to facilitate rapid and accurate responses to search requests directed to content items received from clients of content-search services that employ content-search-service systems.

SUMMARY OF THE INVENTION

Various embodiments of the present invention include concept-service components of content-search-service systems which employ ontologies and vocabularies prepared for particular categories of content at particular times in order to score transcripts prepared from content items to enable a search-service component of a content-search-service system to assign estimates of the relatedness of portions of a content item to search criteria in order to render search results to clients of the content-search-service system. The concept-service component processes a search request to generate lists of related terms, and then employs the lists of related terms to process transcripts in order to score transcripts based on information contained in the ontologies.

BRIEF DESCRIPTION OF THE DRAWINGS

FIG. 8 shows a list representation of an ontology, according to one embodiment of the present invention.

FIG. 9 shows a portion of an ontology representation used in one embodiment of the present invention.

FIG. 11 illustrates an alternative representation of a transcript, according to one embodiment of the present invention.

FIG. 13 illustrates one embodiment of a scored transcript, according to one embodiment of the present invention.

DETAILED DESCRIPTION OF THE INVENTION

Figure 1:
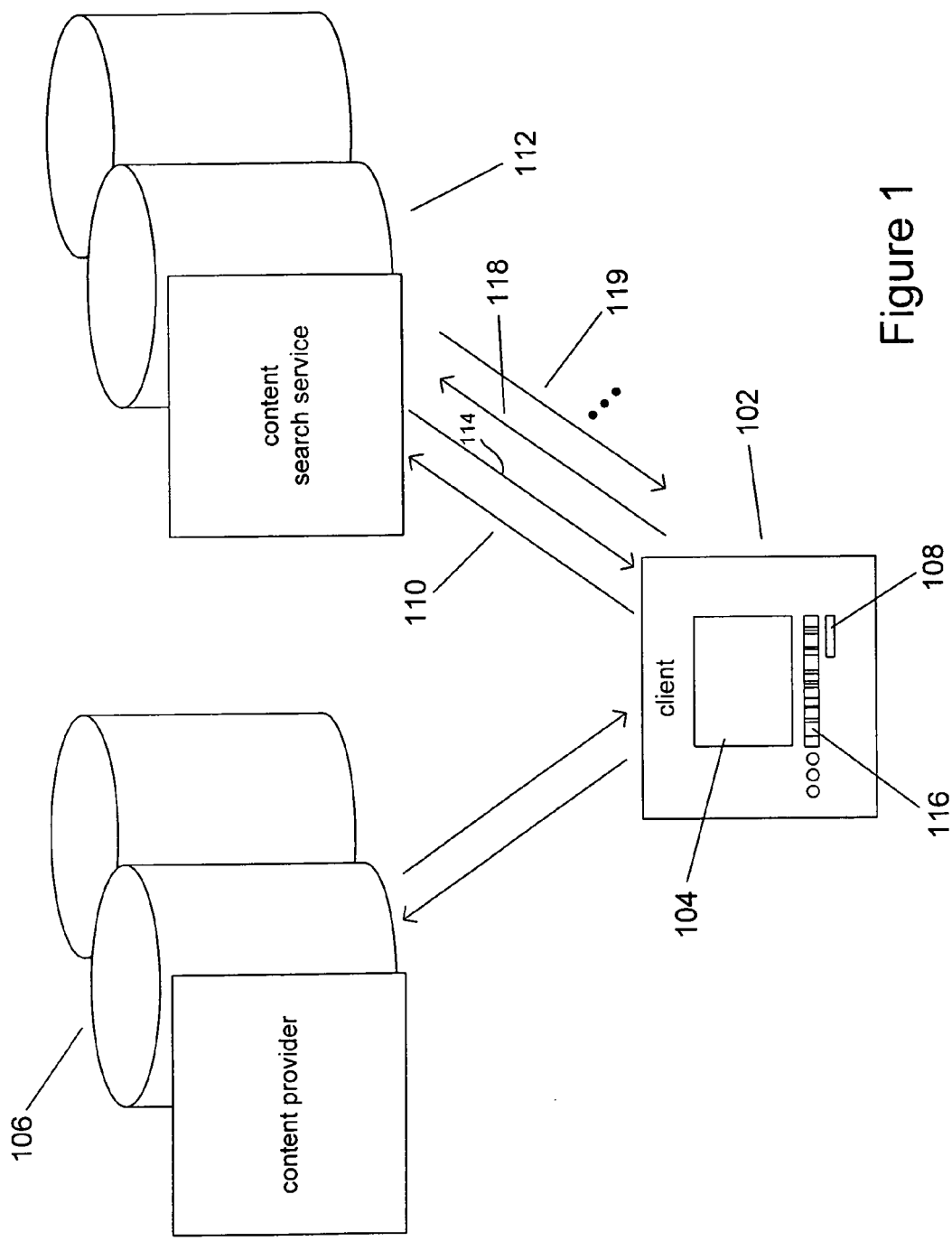
FIG. 1 illustrates provision of search services to a client by a content-search-service system.

Embodiments of the present invention are employed within content-search-service systems that are used to provide content-search services to clients. FIG. 1 illustrates provision of search services to a client by a content-search-service system. The client 102 is generally a personal computer or work station employed by a user to view content 104, provided by a content-provider system 106, via a content-rendering application, such as a video-rendering program invoked by a web browser. In order to facilitate efficient viewing of the content, the user enters a search query, comprising a search term or a search phrase, into a text-entry feature 108 displayed on the client computer and invokes a search of the content being rendered for related portions of the content. In certain embodiments of the present invention, search queries may alternatively be predefined by or for users to facilitate user searching. The search terms or phrases are transmitted 110 to a content-search-service system 112 and processed by the content-search-service system in order to return 114 a graphical rendering of the relatedness of particular portions of the content 116 to the search term or search phrase. The user of the client computer can carry out additional searches for additional search terms or phrases via additional search transactions 118-119.

In general, the content rendered to the user is a type of content that, unlike a text file, cannot be easily searched using commonly available search tools, such as search facilities provided within text editors, in order to find portions of the content of particular interest to the user. In the discussion that follows, the content is assumed to be a video file with an accompanying audio track, such as a news broadcast or sports broadcast provided by a news service or sports service through the Internet to accessing users. However, content-search-service systems, in which embodiments of the current invention may be implemented and employed, may provide search services for a variety of different types of content, from multi-media presentations to various types of images, graphics, and musical selections.

In general, the content provider 106 provides content items to the content-search-service system 112 for preprocessing, to facilitate rapid responses to subsequent client search requests directed to the content items. However, in alternative implementations, the content-search-service system may concurrently receive the content item and search phrase or search term from a client, process the content item to prepare for searching the content, carry out the search request, and render results to the user in real time. In general, client systems are distinct from both content-provider systems and content-search-service systems, although it is possible that the content provider, client, and content-search service may all execute concurrently or simultaneously within a single computer system or distributed computer system.

Figure 2:
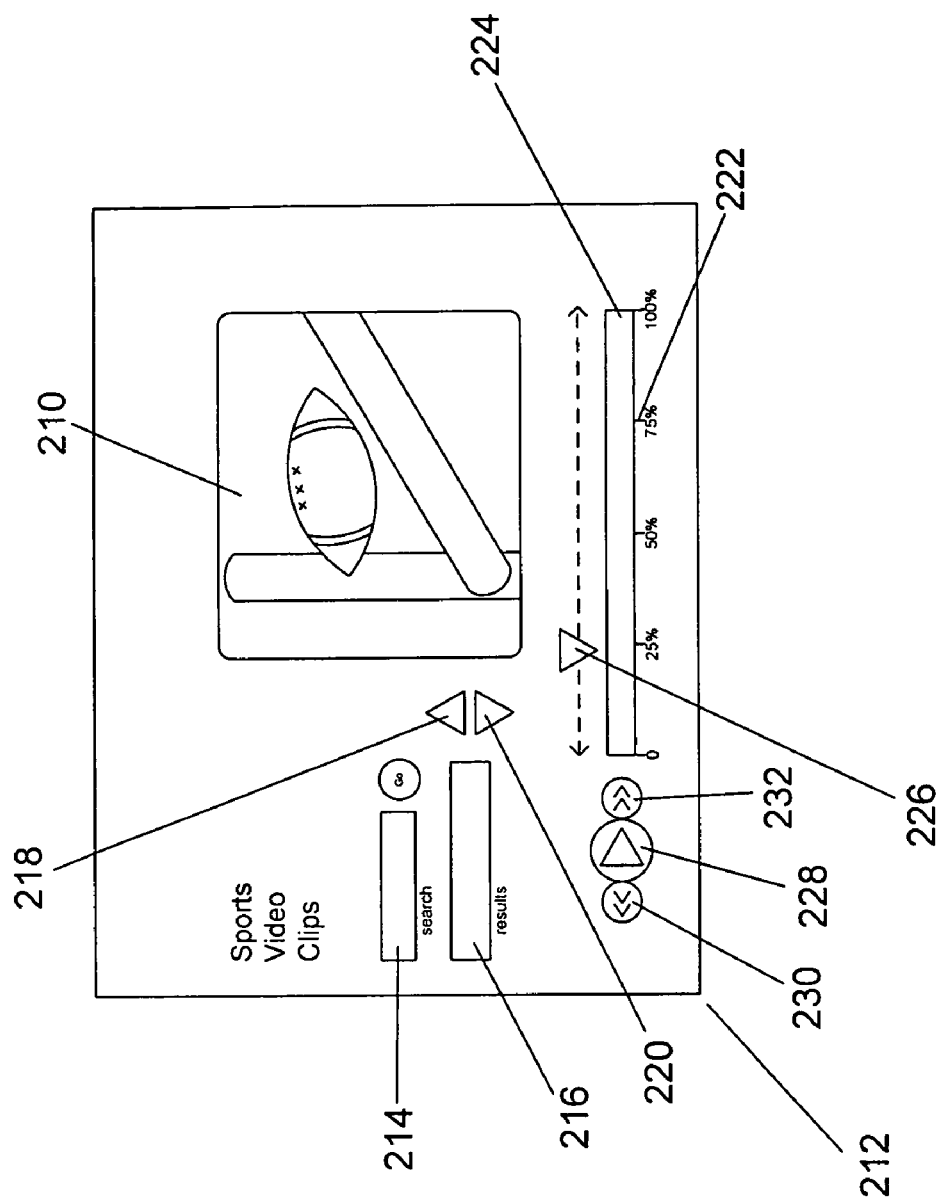
FIG. 2 illustrates a content-rendering application interface.

FIG. 2 illustrates a content-rendering application interface. Video is displayed within a video screen 210 provided by a web-page-based video-clip viewing interface or portable device graphical user interface ("GUI") 212. The device interface or web page provides a text-entry window 214 that allows a user to input text to serve as search criteria for finding desired videos to view, displaying the results of each search in a results window 216 that can be scrolled by scroll-up 218 and scroll-down 220 buttons and from which a video can be selected for display. In addition, a progress display 222 displays, to a user, an indication of the current position within a video clip being displayed during rendering of the video clip, with the entire length of the video clip represented by horizontal bar 224 and the current position within the video clip indicated by the position of a position indicator 226 with respect to the horizontal bar. In FIG. 2, the position indicator 226 indicates that the currently displayed video frame occurs at a position 25% of the way through the video clip. The user interface provides a start/stop button 228 for starting and stopping video clip display, as well as a backward-advance button 230 and forward-advance button 232 that allow the user to seek different positions within the video clip without watching intervening frames.

Figure 3:
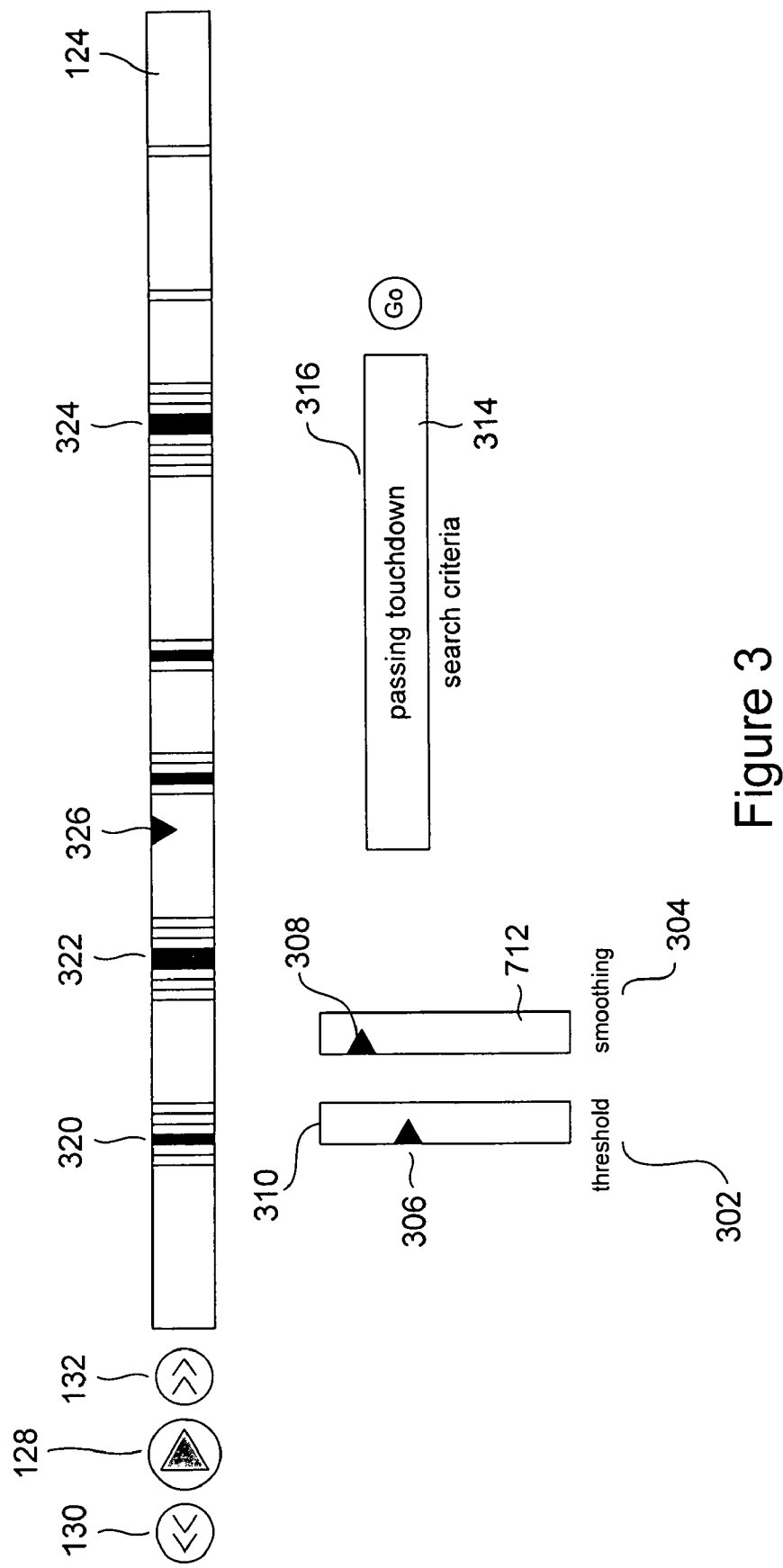
FIG. 3 illustrates a heat-map search-results display that is added to the content-rendering application interface shown in FIG. 2 according to embodiments of the present invention.

FIG. 3 illustrates a heat-map search-results display that is added to the content-rendering application interface shown in FIG. 2 according to embodiments of the present invention. The heat-map search-results display may be provided by a client-side search-results-rendering application downloaded from a content-search-service system. FIG. 3 shows the navigational buttons and progress display of the video-clip viewing interface shown in FIG. 2, along with additional search-results-display features. The backward-advance 130, forward-advance 132, and start/stop 128 buttons have functions in the visual interface identical to the functions described for these interface features of the video-clip viewing interface shown in FIG. 2. The progress display 124 and 126 also has an identical function to that of the video-clip viewing interface shown in FIG. 2, with the exception that, rather than showing a simple, solid-color horizontal bar to represent the extent of the video clip, as in FIG. 2, a heat-map-like representation of a relatedness function is superimposed within the horizontal bar 124 of the progress display. In this heat-map-like representation, darker shading represents relatedness metrics, or scores, of larger magnitude. The visual interface also includes two parameter-specification features 302 and 304 that allow a user to specify, by sliding indicator buttons 306 and 308, respectively along columns 310 and 312, the degree of thresholding and smoothing to employ when computing the relatedness metrics, or scores, for positions within an information encoding with respect to a search criterion 314 specified by the user within a search-criteria-entry window 316. In the example shown in FIG. 3, the horizontal bar 124 of the progress-display component represents the extent of a video clip, and one can easily determine, by visual inspection of the heat map superimposed within the horizontal bar 124, that content related to the currently-specified search criterion may be most probably found at positions 320, 322, and 324. A simpler visual interface may include only a heat-map-like representation of a relatedness function, and may rely on selection features of an existing GUI for inputting search criteria. More complex visual interfaces may include additional selection features to allow additional parameters that control the display of the visual interface and computation of the relatedness function to be specified by a user, including subject-matter domain, for example. Of course, as with all visual interfaces, there are many different ways, and types of selection and input features, that may be used to provide user input of parameters, search criteria, and other input data. In addition, a visual interface may support multiple methods for inputting any particular input data. For example, in the visual interface shown in FIG. 3, a user may be able to select a position at which to start or resume rendering of the information encoding by using the backward-advance and forward-advance buttons, by moving the position indicator, or by inputting a mouse click after moving a pointer to the position as represented by a location within the horizontal bar of the progress-display component.

Figure 4:
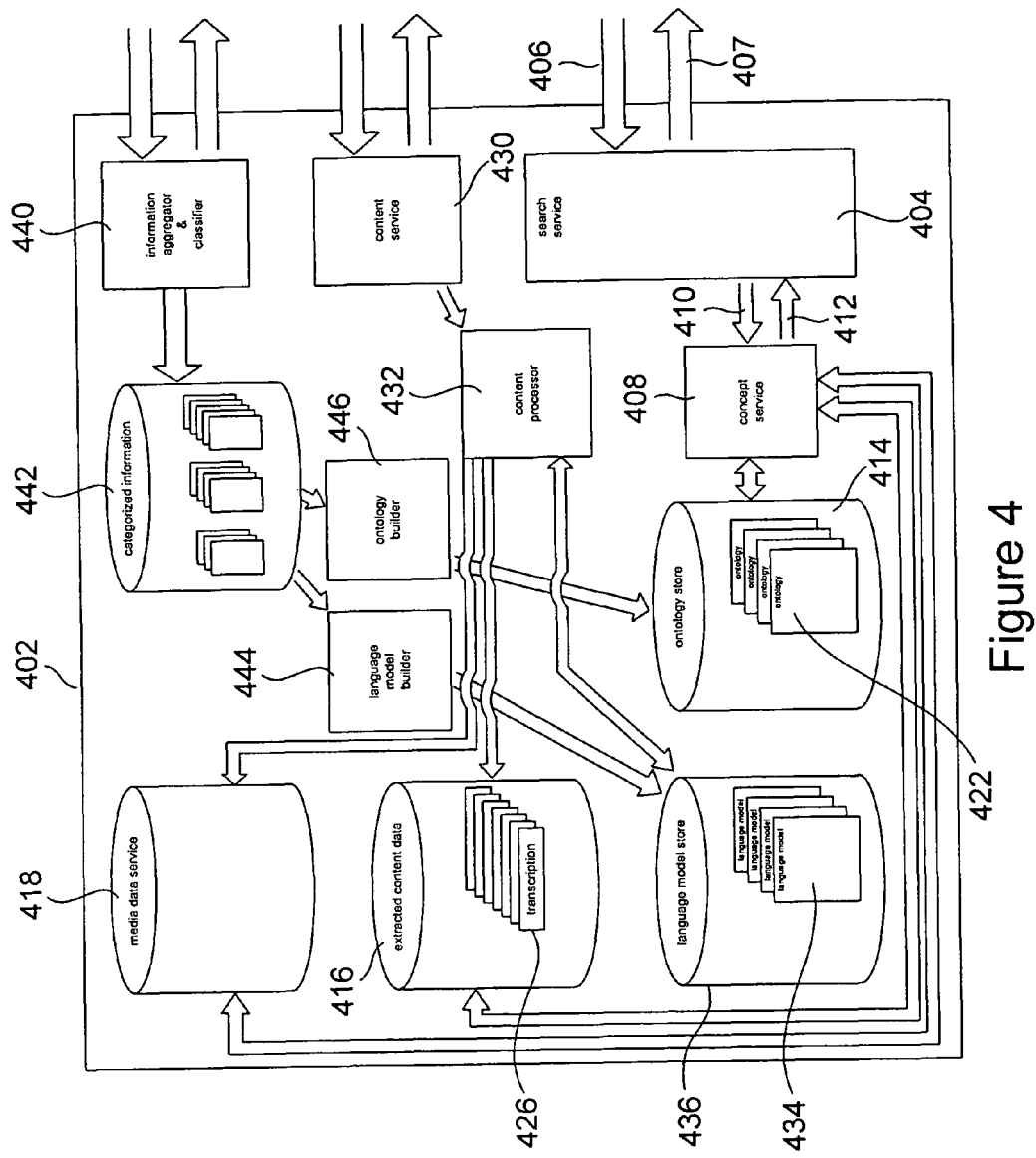
FIG. 4 provides a block-diagram representation of a content-search-service system that represents one embodiment of the present invention.

FIG. 4 provides a block-diagram representation of a content-search-service system that represents one embodiment of the present invention. The content-search-service system ("CSS system") 402 includes a search-service component 404 that receives search requests from clients and responds with search results that are rendered by search-result-rendering applications running on client computers. In one embodiment of the present invention, search requests and responses to search requests are received 406 and transmitted 407 over the Internet according to the web-services protocol in extensible markup language ("XML") messages. A search request includes a content identifier ("Content ID") and a search query, comprising a search term or search phrase. Both of these items are passed, by the search-service component 404, to a concept-service component ("CS component") 408 for processing. The CS component 408 returns a scored transcript 412, or scored portions of a transcript, to the search-service component 404, which uses the scored transcript, and, optionally, a vocabulary returned by the concept-service component, to produce search-result information that is rendered to a user on the client computer. A scored transcript, or partially scored transcript, is, in described embodiments of the present invention, a time-ordered list of tuples, each tuple containing an indication of a term or phrase, the elapsed time, during rendering of a media-content item, at which the term or phrase occurs, and a score that indicates the degree of relatedness of the term or phrase to the search query received by the CS component. The CS component accesses an ontology store 414, an extracted-content-data component 416, and a media-data service 418 in order to obtain an ontology, a transcript, and other information needed by the CS component to score a transcript for return to the search-service component 404. An ontology is, in described embodiments of the present invention, a fully interconnected graph of terms and phrases. Each node of the graph represent a terms or phrase, and each edge of the graph represents the observed co-occurrence relationship of the terms or phrases represented by the nodes connected by the edge within collected information that is analyzed to produce the ontology. Each edge is assigned a weight that reflects the strength of the co-occurrence relationship represented by the edge, and weights are derived from the collected information that is analyzed to produce the ontology. The ontology store 414 includes a number of ontologies, such as ontology 422, which describe co-occurrence relationships between words for various categories of subject matter. Ontologies are also date stamped, or date/time stamped, since ontologies change, over time, for any particular subject matter, and an ontology with a date/time stamp indicating a date within a reasonable offset, in time, from the data of a content item to be searched is most useful for preparing search results. The extracted-content-data component 416 stores one or more transcripts 426 for each content item that has been pre-processed by the CSS system. The media-data service 418 stores information related to each pre-processed content item, including the category of subject matter to which the content item belongs and the date or date and time of creation or reception of the content.

The CSS service additionally includes a content-service component 430 that receives content items from remote content providers, or that searches for, finds, and retrieves content items provided by content providers, and furnishes the content items to a content-processor component 432 that prepares and stores one or more transcripts 426 for each processed content item in the extracted-content-data component 416. The content processor 432 accesses a language model, such as language model 434, stored in a language-model store 436, in order to process a given content item. The content-processor component 432 also deposits additional information about content items in the media-data-service component 418. In the described embodiments of the present invention, transcripts are text-based transcripts of audio tracks and audio files, carried out by automatic-speech-recognition subcomponents of the content processor component. In alternative embodiments of the present invention, text transcripts may be prepared from other types of media content, including descriptive transcripts of still or moving images prepared by computer-vision subcomponents of the content processor component.

An information-aggregator-and-classifier component 440 continuously, or at intervals, searches through information available on the Internet and other information sources for documents, text files, and other information items related to various different categories to which content items may be assigned. The information-aggregator-and-classifier component 440 classifies those information items deemed to be useful to the CSS system by category, and stores the information items, for each category and for particular ranges of dates and times, into a categorized-information-storage component 442. These information items are processed by the information-aggregator-and-classifier component to remove unnecessary information, linguistically normalize terms and phrases, and compute various parameters and values associated with the information items that are used both by the information-aggregator-and-classifier component to classify the items as well as by the language-model-builder component 444 and ontology-builder component 446, which use the information items stored in the categorized-information-storage component 442 to build language models and ontologies, respectively.

Figure 5:
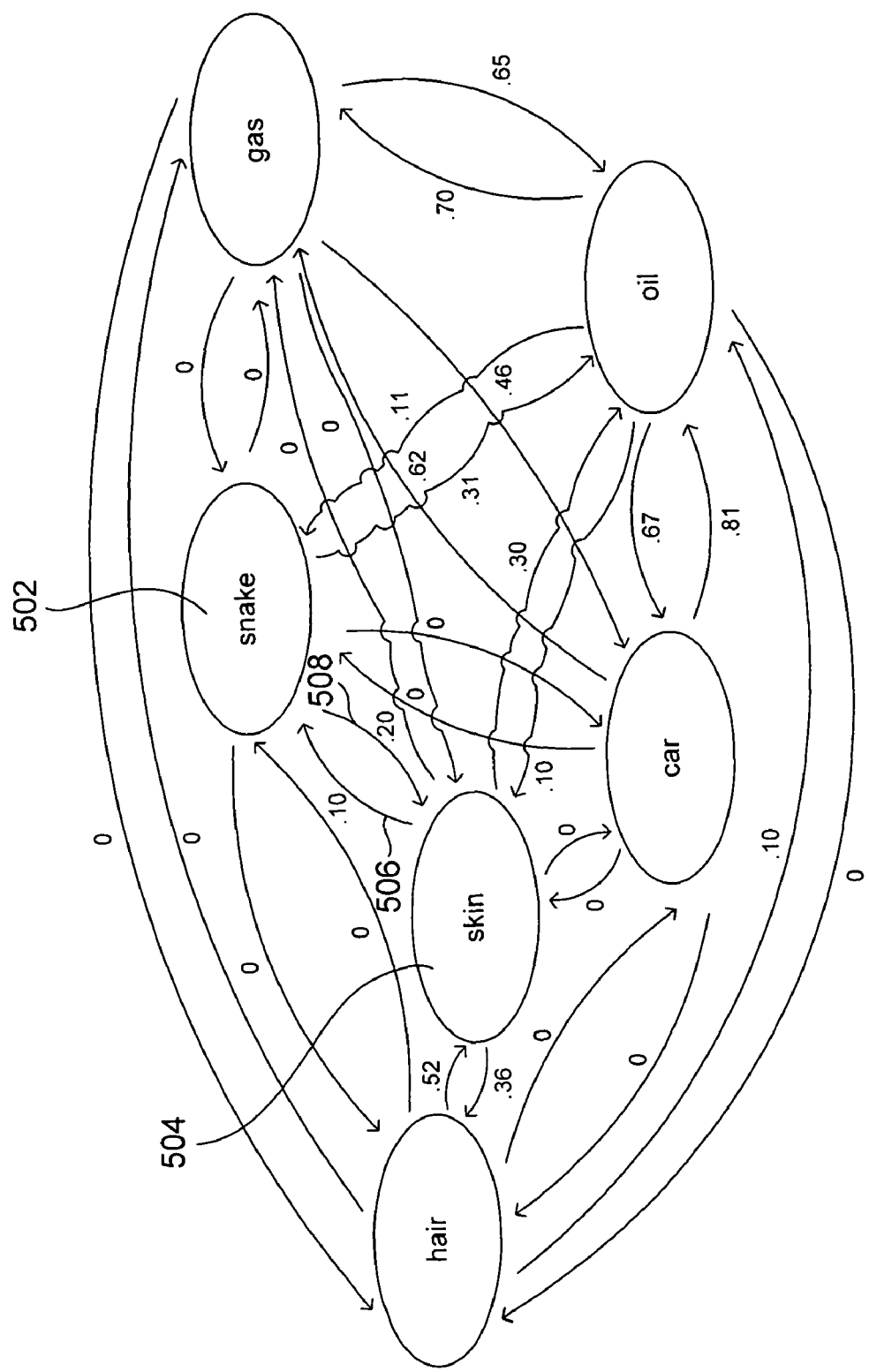
FIG. 5 illustrates an ontology according to one embodiment of the present invention.

FIG. 5 illustrates an ontology according to one embodiment of the present invention. FIG. 5 is a simplified ontology containing only a very few terms. Actual ontologies prepared for useful information categories may contain many hundreds, thousands, or millions of terms and phrases. In FIG. 5, each of six terms is represented by oval nodes, such as oval node 502 representing the term "snake." Each possible pair of terms, such as the pair of terms "snake" 502 and "skin" 504, are interconnected by two arcs, such as arcs 506 and 508 interconnecting terms 502 and 504. The two arcs form a bi-directional pair, one arc of the pair directed from a first term or phrase (source term or source phrase for the arc) to a second term or phrase (target term or target phrase for the arc), and the second arc of the pair directed from the second term or phrase to the first term or phrase. Each arc is labeled with a numeric value in the range [0.0, 1.0]. The numeric value is a normalized co-occurrence metric that indicates a frequency at which the target term or phrase of the arc co-occurs with the source term or phrase of the arc. Thus, in FIG. 5, arc 506 indicates that the term "snake" co-occurs at a relatively low frequency with the term "skin," while the term "skin" co-occurs at a somewhat higher frequency with the term "snake." The fact that the co-occurrence metrics for the two arcs in a bi-directional pair of arcs interconnecting two terms or phrases are not equal reflects different distributions of the terms or phrases and different numbers of occurrences of the terms or phrases in the many information items from which the ontologies are prepared, as well as different normalizations for the two terms or phrases. Referring back to FIG. 4, the ontologies, such as the simple ontology shown in FIG. 5, are prepared by the ontology-builder component 446 of the CSS system by analyzing a large number of information items related to a particular category and collected over a particular interval of time. Thus, each ontology, such as the ontology illustrated in FIG. 5, is associated with a particular category of information and is stamped with a date and/or date/time corresponding to the date or date and time, respectively, when the information entities used by the ontology builder component to build the ontology were collected by the information-aggregator-and-classifier component 440 of the CSS system 402.

Each ontology is physically or conceptually associated with a vocabulary. The vocabulary is also prepared from information items collected by the information-aggregator-and-classifier component (440 in FIG. 4) of the CSS system. In certain embodiments, the vocabulary for a category of information is prepared by the language-model-builder component (444 in FIG. 4) of the CSS system and stored in the language-model store (436 in FIG. 4). In other embodiments of the present invention, the vocabulary may be constructed by the ontology-builder component (446 in FIG. 4) and stored in the ontology store (414 in FIG. 4), and in still alternative embodiments, the vocabulary may be constructed by yet an additional component of the CSS.

Figure 6:
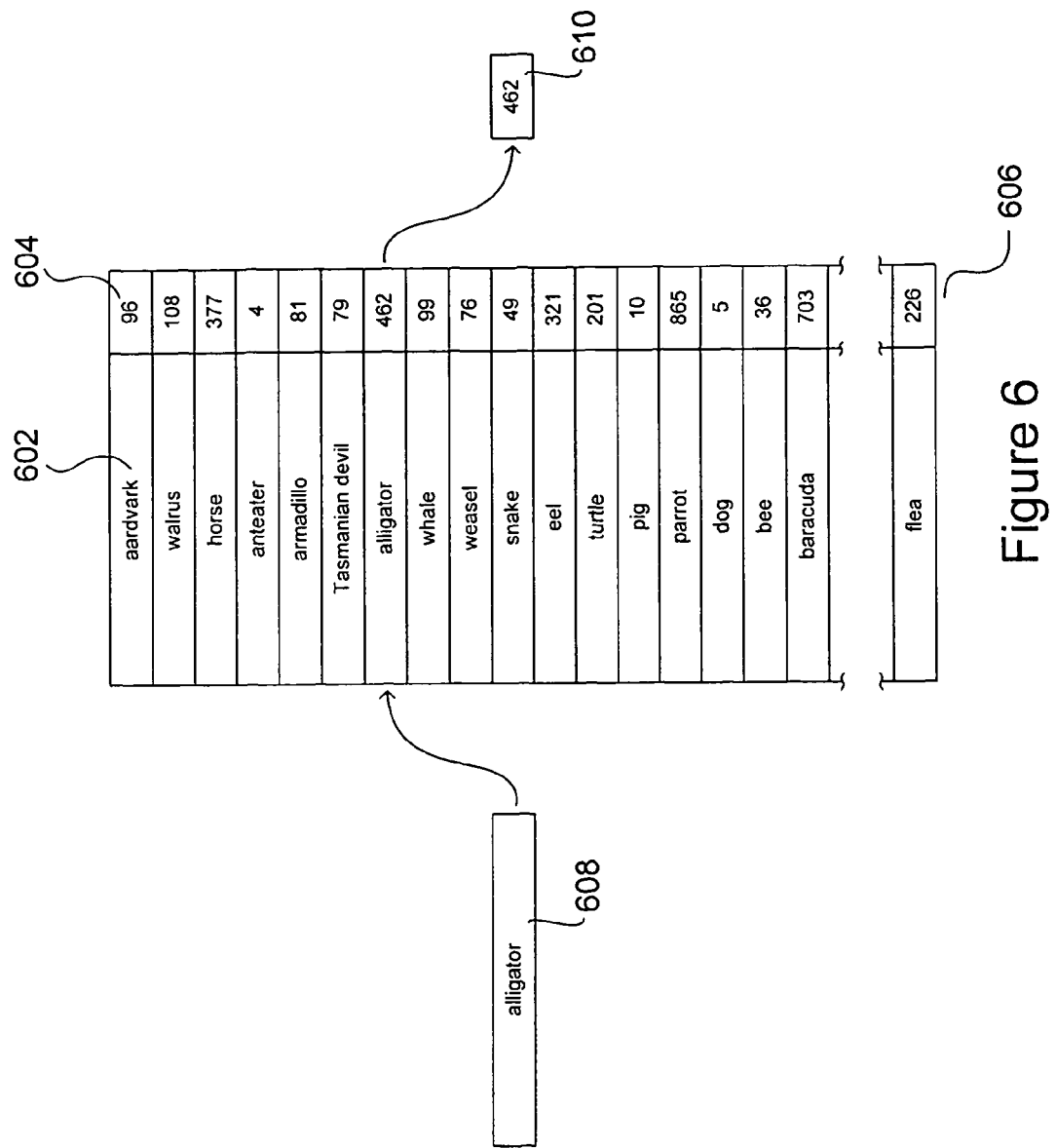
FIG. 6 shows a portion of an exemplary vocabulary for the category "animals," according to one embodiment of the present invention.

A vocabulary comprises a list of nouns, or noun phrases, in one embodiment of the present invention, that commonly occur in information items related to a particular information category. For example, a sports category for content items might be expected to include nouns such as "bat," "base," "pitcher," "quarterback," "goalpost," "football," "javelin," "roller derby," and other such nouns and noun phrases. Because it is inefficient to programmatically manipulate strings of symbols, such as character strings, when implementing components of the CSS system, each term or phrase in a vocabulary is represented by an integer value. FIG. 6 shows a portion of an exemplary vocabulary for the category "animals," according to one embodiment of the present invention. As can be seen in FIG. 6, the character-string representation of the name of each animal, such as the character string "aardvark" 602, is associated with a small-integer value, such as the value "96" 604 in the table 606 that constitutes a vocabulary for the information category "animals." Using this table, the character string "alligator" 608 is easily translated to the integer "462" 610 by a table-lookup operation. As with any computationally processed and electronically stored data, the vocabulary can be ordered in alphabetical order and/or numeric order, and may be additionally associated with indexes or other additional information to allow terms and phrases to be quickly located in the table and accessed.

Figure 7:
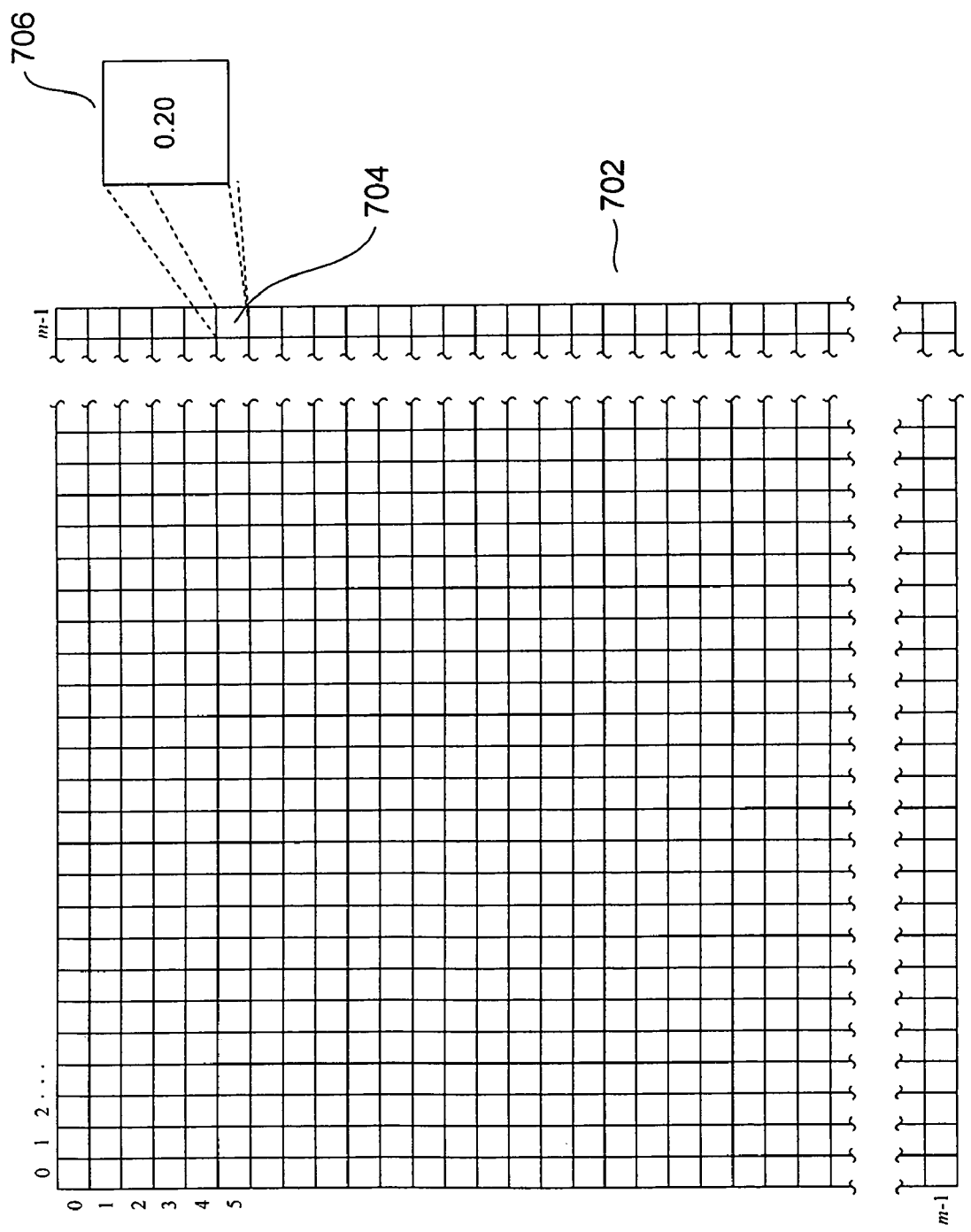
FIG. 7 illustrates an m×m representation of an ontology, according to one embodiment of the present invention.

While it is convenient to represent an ontology as a graph that includes term and phrase nodes interconnected by arcs, as shown in FIG. 5, an ontology can be more easily manipulated, computationally, when represented as an m×m array, where m is the number of terms and phrases of a particular vocabulary. FIG. 7 illustrates an m×m representation of an ontology, according to one embodiment of the present invention. The m×m array 702 comprises $m^2$ cells, each cell, such as cell 704, containing one or more co-occurrence metrics that label an arc, such as arc 508 in FIG. 5, emanating from a first ontology node, such as node 502 in FIG. 5, and directed to a second ontology node, such as node 504 in FIG. 5. The row index of the cell indicates the integer value corresponding to the first node, from which the arc emanates, and the column index of the cell indicates the second node, to which the arc is directed. Cell 704 has array indices (5, m−1), indicating that the co-occurrence metrics included in the cell, such as metric "0.20" 706 in FIG. 7, label an arc from the vocabulary word or phrase specified by the integer "5" to the vocabulary term or phrase specified by the integer m−1.

The m×m representation of an ontology, shown in FIG. 7, is a useful abstraction, but is generally also computationally inefficient. One reason that this representation is inefficient is that, for practical ontologies, co-occurrence metrics below a threshold value are considered to be meaningless, and are all assigned a minimum value, such as the value "0.0." Therefore, the m×m array, shown in FIG. 7, is generally quite sparse. For that reason, and to facilitate rapid access to particular co-occurrence metrics for particular words and phrases of the vocabulary, the ontology is normally represented as a list. FIG. 8 shows a list representation of an ontology, according to one embodiment of the present invention. In FIG. 8, each element of the list 802, such as element 804, is represented as a row containing three cells. The first cell 806 of row 804 is the numeric representation of the target of an arc in the graph representation of an ontology, the second cell 808 is the source of an arc, in the graphical representation of an ontology, and the third cell 810 contains the co-occurrence metric by which the arc is labeled. Only entries with non-zero metrics are included in the list 802, solving the problem of sparseness associated with m×m array representations of an ontology. Each entry in the list represents a single arc of an ontology. The entries are sorted, in FIG. 8, in ascending order with respect to the value stored in the first cell of each entry, as readily seen by the values in the first cells of the entries in FIG. 8. This organization facilitates access to those entries associated with a particular term or phrase to which an arc is directed in the graphical representation of the ontology. In certain embodiments, the entries may additionally be sorted with respect to the value stored in the second cell of each entry, and in yet additional embodiments, the list-representation of an ontology may be accompanied by one or more tables of references, or indexes, to facilitate rapid access to particular entries of the ontology.

In practice, even the list representation of an ontology, shown in FIG. 8, may be somewhat of an abstraction. In one embodiment of the present invention, the ontology includes the raw data employed to compute the co-occurrence metric, for each entry, rather than the computed co-occurrence metric. FIG. 9 shows a portion of an ontology representation used in one embodiment of the present invention. The ontology is represented as a list 902, similar to the list representation illustrated in illustrated in FIG. 8. However, instead of including a single, computed co-occurrence metric, as in FIG. 8, each entry in the list of FIG. 9 includes, in one embodiment of the present invention, three numeric values 904-906 that encode the number of occurrences of the word or phrase represented by the value stored in the first element 908 of the entry, within the same information item, or within a subunit or subsection of the information item, as the word or phrase represented by the value stored in the second cell 910 of the entry in a large number of collected and processed information items corresponding to the information category for which the ontology is prepared.

Figure 10:
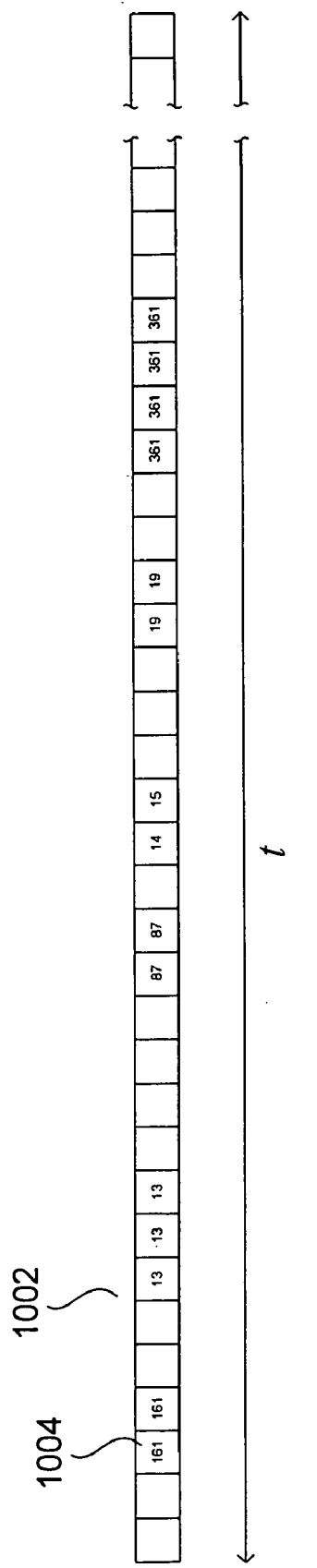
FIG. 10 illustrates one implementation of a transcript, according to one embodiment of the present invention.

In the current discussion, content items are video files that include audio tracks. In one embodiment of the present invention, searching is carried out by the CSS system exclusively on the audio track of a video file, using terms and phrases input by a user to find those terms or phrases, or related terms and phrases, which occur at points in time in the audio track. Thus, portions of the audio track can be identified as being related to search terms and of particular interest to a user. Those portions of the audio track can, in turn, be related to the video images that are displayed in the interval of time in which the portions of the audio track are rendered, when the video file is presented to the user by a video-file-rendering application. In these embodiments, a transcript (426 in FIG. 4) is essentially a list of term or phrase occurrences associated with a time, or time interval, when the terms or term phrases occur in the audio track during rendering of the audio track to a user. FIG. 10 illustrates one implementation of a transcript, according to one embodiment of the present invention. In FIG. 10, each cell in a one-dimensional array 1002, such as cell 1004, is either blank, indicating that no word or phrase was recognized during that time interval, or contains a numeric representation of a word or phrase selected from the vocabulary associated with the category of the content item from which the transcript is prepared. In this embodiment of a transcript, each cell represents a small, fixed interval of time, so that the one-dimensional array 1002 represents a time line for rendering of the audio track of a video file. FIG. 11 illustrates an alternative representation of a transcript, according to one embodiment of the present invention. In FIG. 11, the transcript is represented as a list, or two-dimensional array, each entry, or row, of which contains a numeric value indicating a word or phrase from a vocabulary, such as numeric value 1102, and an associated time at which the word or phrase occurs in the audio track, such as time 1104, both within entry 1106. Many alternative representations of transcripts are possible.

Figure 12:
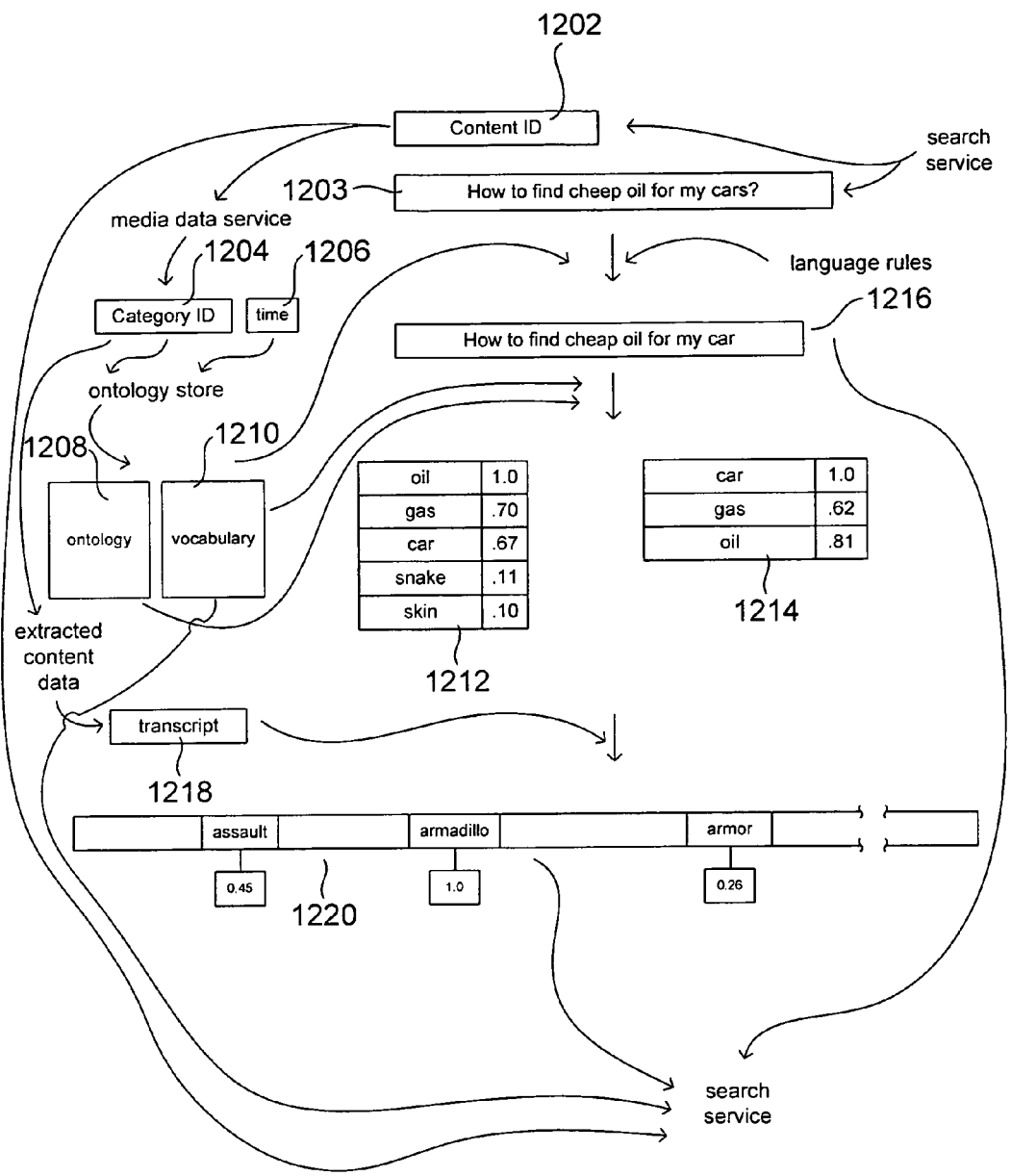
FIG. 12 illustrates operation of the concept-service component (408 in FIG. 4) of a content-search-service system that represents one embodiment of the present invention.

FIG. 12 illustrates operation of the CS component (408 in FIG. 4) of a CSS that represents one embodiment of the present invention. The CS component receives a content ID 1202 and a search query 1203 from the search-service component (404 in FIG. 4) of the CSS that represents one embodiment of the present invention. The content ID is generally a numerical identifier, or alphanumeric string, that uniquely identifies a particular content item. The CS component uses the content ID 1202 to access the media-data-service component (418 in FIG. 4) to obtain a category ID 1204 for the content item and a date/time 1206 for the content item. The CS component additionally accesses the ontology store (414 in FIG. 4) and, in certain embodiments, the language-model store (436 in FIG. 4) in order to obtain an ontology 1208 and a vocabulary 1210 appropriate for the content item. Using the ontology and vocabulary 1208 and 1210, and using various language-processing rules and routines, the CS component then processes the received search query 1203 to generate one or more term-or-phrase lists 1212 and 1214. First, the search query is corrected for spelling mistakes and partially normalized to produce a modified search term or phrase 1216. The modified search query 1216 is then processed to extract those words that occur in the vocabulary for the category to which the content item identified by the content ID 1202 belongs. The category is identified by the category ID 1204 obtained from the media-data-service component. Each list 1212 and 1214 comprises a search term or phrase and additional, related search terms and phrases, as obtained from the ontology 1208. Each term or phrase in the list is associated with a co-occurrence-metric value extracted from the ontology. In the example shown in FIG. 12, the terms "gas," "car," "snake," and "skin" are found, in the ontology, to be related to the search term "oil," and are therefore included in list 1212 for the search term "oil." Similarly, the list 1214 contains the search term "car" and the additional, related terms "gas" and "oil." The related terms and phrases are obtained, from the ontology, from those entries in which a search-entries in which a search-query term or phrase occurs as the first value in the ontology entries (see FIGS. 8 and 9). Once the lists have been prepared, the CS component then accesses the extracted-content-data component (416 in FIG. 4) to obtain a transcript for the content item 1218. The CS component then uses the lists 1212 and 1214 to assign co-occurrence metrics to those terms and phrases of the transcript 1218 that occur in the vocabulary of the category to which the content item belongs, to produce a scored transcript 1220. The CS service then, in one embodiment of the present invention, returns the scored transcript and content ID, and, optionally, the modified search phrase 1216 and a reference to the vocabulary, to the search-service component (404 in FIG. 4) of the CSS system. The search-service component then further processes the scored transcript to render search results to a user.

Figure 13:
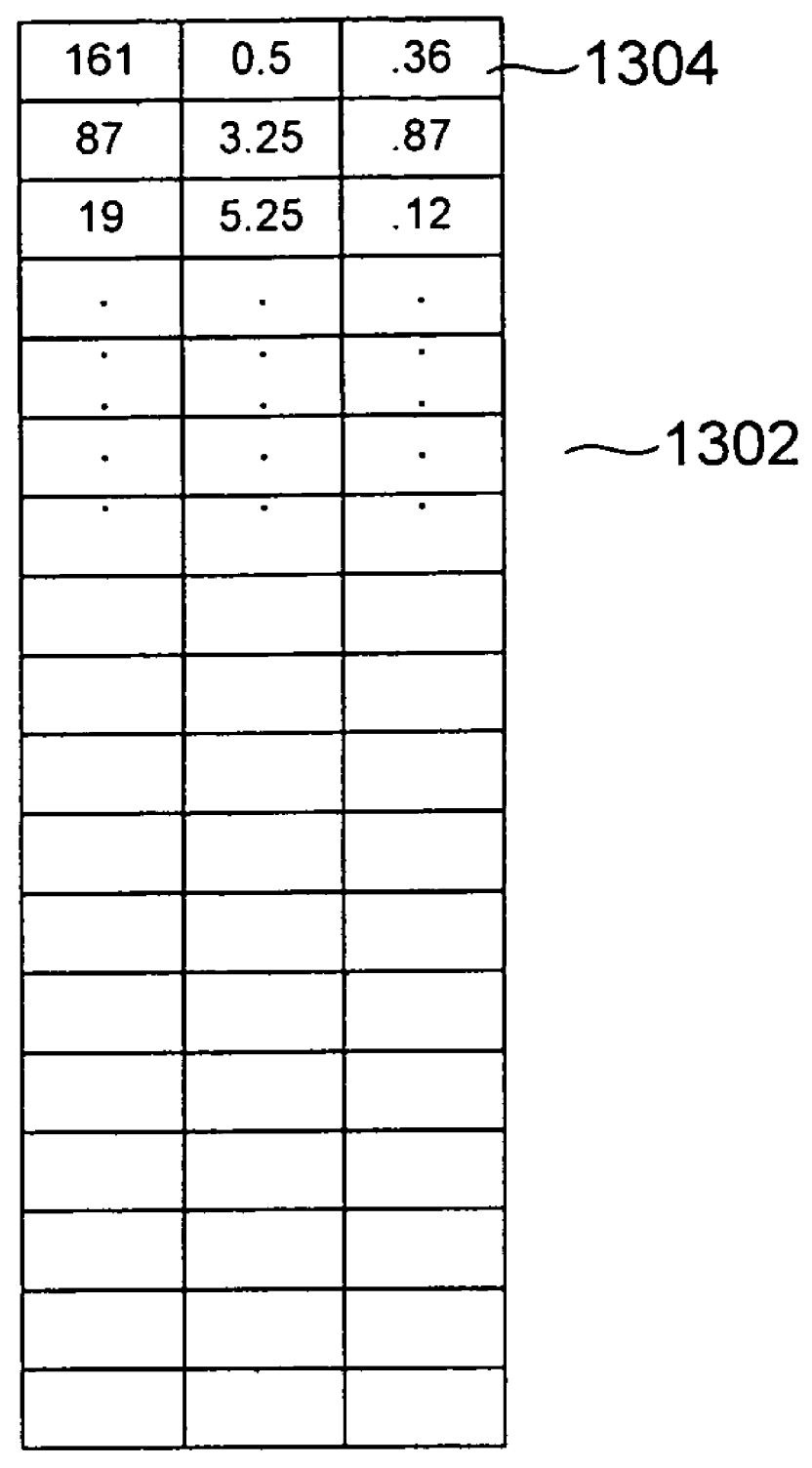

FIG. 13 illustrates one embodiment of a scored transcript, according to one embodiment of the present invention. The scored transcript is a list of tuples, each tuple of which is represented in FIG. 13 by a row, such as row 1304. Each tuple, such as tuple 1304, includes the numeric representation of a word or phrase, an indication of the elapsed time at which the word or phrase occurs in the audio transcript, and a score computed for the word or phrase. In general, the score is a function of the co-occurrence metric or metrics obtained from the ontology used to score the transcript. In one embodiment of the present invention, for example, the score is simply the co-occurrence metric obtained from the ontology, unless the term or phrase for which the score is computed occurs in multiple lists, such as in both of lists 1212 and 1214 in the example of FIG. 12, in which case the score may be computed as the average, or as a weighted average, of the co-occurrence metrics associated with the term in any of the lists in which the term or phrase occurs.

Figure 14:
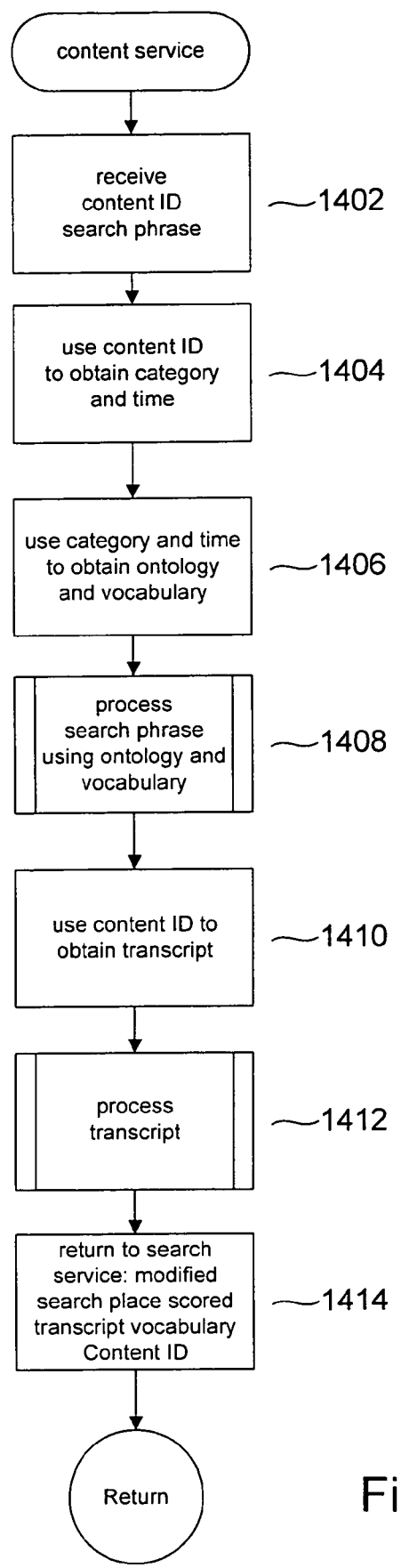
FIG. 14 provides a control-flow diagram for the concept-service component of a CSS system, according to one embodiment of the present invention.

FIG. 14 provides a control-flow diagram for the CS component of a CSS system, according to one embodiment of the present invention. In step 1402, the CS component receives a content ID that uniquely identifies a content item and a search term or phrase. In step 1404, the CS component uses the content ID to obtain a category ID and date/time for the content ID. The category ID identifies the information category to which the content item belongs, and the date/time identifies the date or date and time with which the content item is associated, to enable the CS component to find an appropriate ontology and vocabulary for the content item. In step 1406, the CS component uses the category and date/time obtained in step 1404 to obtain an appropriate ontology and vocabulary for the content item. In step 1408, the CS component processes the received search term or search phrase using the obtained ontology and vocabulary, via a call to the routine "process search phrase." In step 1410, the CS component uses the content ID obtained in step 1404 to, in turn, obtain a transcript for the content item identified by the content ID. Then, in step 1412, the CS component processes the transcript, via a call to the routine "process transcript." Finally, in step 1414, the CS component returns to a search-service component of a CSS, from which the CS component received the content ID and search phrase, in step 1402, the scored transcript returned by the routine "process transcript," in step 1412, the content ID, and, optionally, a modified search phrase, produced by the routine "process search phrase," called in step 1408, and a reference to the vocabulary obtained in step 1406.

Figure 15:
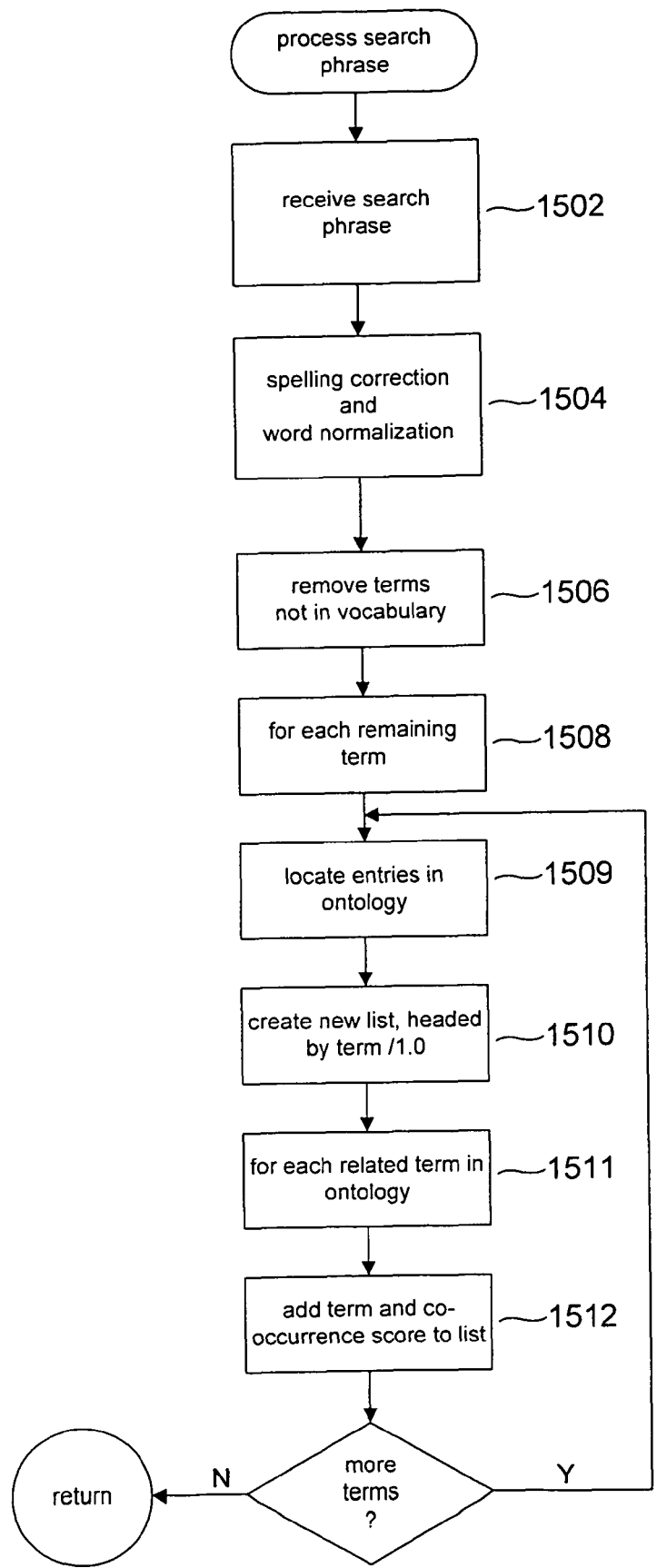
FIG. 15 is a control-flow diagram for the routine "process search phrase" called in step 1408 of FIG. 14, according to one embodiment of the present invention.

FIG. 15 is a control-flow diagram for the routine "process search phrase" called in step 1408 of FIG. 14, according to one embodiment of the present invention. In step 1502, the routine "process search phrase" receives a search phrase. In step 1504, spelling of the terms in the search phrase are corrected and words in the search phrase are normalized according to language rules and language routines. For example, plural terms may be replaced by singular terms, and terms and phrases derived from root terms and phrases may be replaced by the root terms and phrases. Then, in step 1506, any terms and phrases that cannot be found in the vocabulary obtained in step 1406 of FIG. 14 are removed, leaving one or more terms and phrases selected from the vocabulary associated with the category of information to which the content item belongs. Then, in the for-loop of steps 1508-1513, a list of related terms is created for each term and phrase of the terms and phrases remaining after step 1506. Again, as discussed above, the co-occurrence score associated with each term and phrase in each list is generally the co-occurrence metric obtained from the ontology obtained in step 1406 of FIG. 14.

Figure 16:
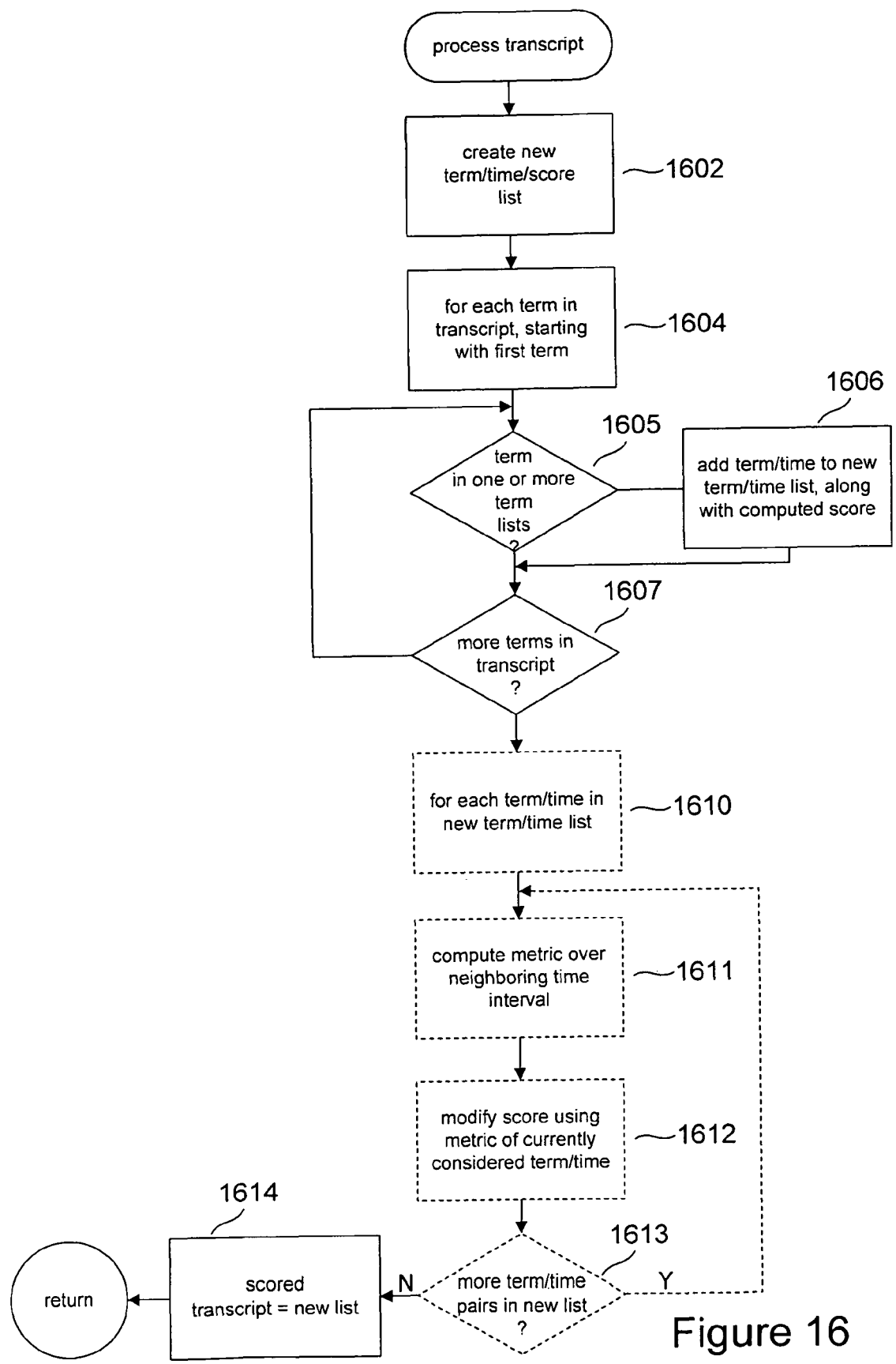
FIG. 16 provides a control-flow diagram for the routine "process transcript," called in step 1412 of FIG. 14, according to one embodiment of the present invention.

FIG. 16 provides a control-flow diagram for the routine "process transcript," called in step 1412 of FIG. 14, according to one embodiment of the present invention. In step 1602, a new term/time/score list, such as that shown in FIG. 13, is created. Then, in the for-loop of steps 1604-1607, each term in the transcript obtained in step 1410 of FIG. 14 is considered during each iteration of the for-loop, and a term/time/score tuple is entered into the new term/time/score list, created in step 1602, for the currently considered term or phrase. As discussed above, the score entered for a term or phrase is generally a function of the co-occurrence metric or metrics obtained from the ontology, or, when the term or phrase occurs in multiple lists prepared in the for-loop of steps 1508-1513 of FIG. 15, the score may be computed as an average, weighted average, or some other function of the multiple occurrences of the term or phrase and stored for the term or phrase. In certain embodiments of the present invention, an optional, additional calculation may be performed upon the list of term/time/score tuples produced by the for-loop of steps 1604-1607. For example, in one embodiment of the present invention, a for-loop of steps 1610-1613 may be executed to again consider each term/time/score tuple in a newly created term/time/score list in order to modify each score according to terms and phrases neighboring a given term or phrase, in time, within the term/time/score list. For example, the fact that a particular time interval in the transcript contains occurrences of phrases or terms from all, or a majority, of the lists, prepared in steps 1508-1513 of FIG. 15, may indicate that the scores associated with the terms and phrases in that interval should be increased, to reflect a higher probability that the occurrences of the terms and phrases are truly related to the search phrase. Many additional considerations may be made in additional passes through the term/time/score list. Finally, in step 1614, the term/time/score list, prepared by the routine "process transcript," is returned as the scored transcript.

Although the present invention has been described in terms of particular embodiments, it is not intended that the invention be limited to these embodiments. Modifications within the spirit of the invention will be apparent to those skilled in the art. For example, the CS component of a CSS system can be implemented in any number of different programming languages for execution on any number of different operating systems running on different hardware platforms within many different types of CSS systems. Implementations of the CS component may vary according to variations in familiar programming parameters and characteristics, including control structures, data structures, modular organization, and other familiar parameters and characteristics. As discussed above, many different types of ontologies and ontology representations, and many different types of transcripts, and transcript representations, may be employed by various embodiments of the CS component to prepare scored transcripts. Co-occurrence metrics and other numeric values may have different ranges and representations, in alternative embodiments.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A concept-service component of a content-search-service system for searching a content item having an audio track, the concept-service component comprising:
 a hardware processor configured to:
  receive, as input, a content ID and search query, wherein the content ID uniquely identifies the content item;
  use the content ID to retrieve a category ID, ontology, vocabulary, and a transcript, wherein:
   the category ID relates to a subject matter of the content item, and
   the transcript includes a textual rendering of the audio track;
  receive a search query and corrects and linguistically normalizes terms or phrases within the search query; and
  use the linguistically normalized terms and phrases to process the transcript to assign ontology-based scores to terms or phrases in the transcript using a transcript scorer; and
 a memory coupled with the processor,
 wherein the transcript scorer:

prepares a list of term/ontology-metric pairs for each term or phrase in the linguistically normalized terms or phrases of the search query; and for each term or phrase in the transcript, associates a score with the term or phrase based on co-occurrence-metrics in the prepared lists of term/ontology-metric pairs, and wherein the transcript-scorer prepares a list of term/ontology-metric pairs for each term or phrase in the linguistically normalized terms or phrases of the search query by:

identifying each entry in the ontology that includes the term or phrase paired with a second term; and for each identified entry,
computing a co-occurrence metric as a combination of the co-occurrence values in the identified entry, and
adding an entry to the list that includes the second term and the computed co-occurrence metric; and
adding an entry to the list that includes the term and an identical-term co-occurrence metric.

2. The concept-service component of claim 1 wherein the hardware processor requests a category ID and date or date/time indication that corresponds to the received content ID from a media-data-storage component of the content-search-service system.

3. The concept-service component of claim 2 wherein the hardware processor requests an ontology and vocabulary from an ontology-store component of the content-search-service system, using the category ID and date or date/time indication and a transcript from an extracted-content-storage component using the received content ID.

4. The concept-service component of claim 2 wherein the hardware processor is further configured to:

apply language rules and dictionary-based routines to the terms or phrases within the received search query to correct spellings of any misspelled terms in the search query;

apply language routines to normalize the terms or phrases within the received search query by changing plural forms to corresponding singular forms and replacing derivative terms with root forms of the derivative terms; and filter from the search query terms that do not occur in the received vocabulary.

5. A concept-service component of a content-search-service system for searching a content item having an audio track, the concept-service component comprising:

a hardware processor configured to:
receive, as input, a content ID and search query, wherein the content ID uniquely identifies the content item;
use the content ID to retrieve a category ID, ontology, vocabulary, and a transcript, wherein:
the category ID relates to a subject matter of the content item, and
the transcript includes a textual rendering of the audio track;
receive a search query and corrects and linguistically normalizes terms or phrases within the search query; and
use the linguistically normalized terms and phrases to process the transcript to assign ontology-based scores to terms or phrases in the transcript using a transcript scorer; and
a memory coupled with the processor,
wherein the transcript scorer:

prepares a list of term/ontology-metric pairs for each term or phrase in the linguistically normalized terms or phrases of the search query; and for each term or phrase in the transcript, associates a score with the term or phrase based on co-occurrence-metrics in the prepared lists of term/ontology-metric pairs, and wherein the transcript-scorer, for each currently considered term or phrase in the transcript, associates a score with the term or phrase based on co-occurrence-metrics in the prepared lists of term/ontology-metric pairs by:

identifying each entry in each list of term/ontology-metric pairs in which the ontology that includes the currently considered term or phrase;

when two or more entries are identified, adding the co-occurrence metrics of the identified entries together and computing a score from the sum;

when one entry is identified, using the co-occurrence metric in the identified entry as the score; and associating the score with the currently considered term or phrase.

6. The concept-service component of claim 5 wherein the hardware processor requests a category ID and date or date/time indication that corresponds to the received content ID from a media-data-storage component of the content-search-service system.

7. The concept-service component of claim 5 wherein the hardware processor requests an ontology and vocabulary from an ontology-store component of the content-search-service system, using the category ID and date or date/time indication and a transcript from an extracted-content-storage component using the received content ID.

8. The concept-service component of claim 5 wherein the hardware processor is further configured to:

apply language rules and dictionary-based routines to the terms or phrases within the received search query to correct spellings of any misspelled terms in the search query;

apply language routines to normalize the terms or phrases within the received search query by changing plural forms to corresponding singular forms and replacing derivative terms with root forms of the derivative terms; and filter from the search query terms that do not occur in the received vocabulary.

9. A computer-implemented method for searching for, and identifying, points in a transcribed media-content item related to a search query, the method comprising:

receiving, as input, a content ID and search query, wherein the content ID uniquely identifies a particular content item;

using the content ID to retrieve a category ID, ontology, vocabulary, and a transcript, wherein:
the category ID relates to a subject matter of the content item, and
the transcript includes a textual rendering of an audio track of the content item;

correcting and linguistically normalizing terms or phrases within the search query; and using the linguistically normalized terms and phrases to process the transcript to assign ontology-based scores to terms or phrases in the transcript, wherein processing the transcript to assign ontology-based scores to terms or phrases further comprises:

preparing a list of term/ontology-metric pairs for each term or phrase in the linguistically normalized terms or phrases of the search query; and for each term or phrase in the transcript, associating a score with the term or phrase based on co-occurrence-metrics in the prepared lists of term/ontology-metric pairs, wherein preparing a list of term/ontology-metric pairs for each term or phrase in the linguistically normalized terms or phrases of the search query further comprises:

identifying each entry in the ontology that includes the term or phrase paired with a second term; and for each identified entry, computing a co-occurrence metric as a combination of the co-occurrence values in the identified entry, and adding an entry to the list that includes the second term and the computed co-occurrence metric; and adding an entry to the list that includes the term and a identical-term co-occurrence metric.

10. The computer-implemented method of claim 9 further comprising requesting a category ID and date or date/time indication that corresponds to the received content ID from a media-data-storage component of a content-search-service system.

11. The computer-implemented method of claim 10 further comprising requesting an ontology and vocabulary from an ontology-store component of the content-search-service system, using the category ID and date or date/time indication and requesting a transcript from an extracted-content-storage component of the content-search-service system using the received content ID.

12. The computer-implemented method of claim 9 wherein correcting and linguistically normalizing terms or phrases within the search query further comprises:

applying language rules and dictionary-based routines to the terms or phrases within the search query to correct spellings of any misspelled terms in the search query;

applying language routines to normalize the terms or phrases within the received search query by changing plural forms to corresponding singular forms and replacing derivative terms with root forms of the derivative terms; and filtering from the search query terms that do not occur in the received vocabulary.

13. A computer-implemented method for searching for, and identifying, points in a transcribed media-content item related to a search query, the method comprising:

receiving, as input, a content ID and search query, wherein the content ID uniquely identifies a particular content item;

using the content ID to retrieve a category ID, ontology, vocabulary, and a transcript, wherein:

the category ID relates to a subject matter of the content item, and the transcript includes a textual rendering of an audio track of the content item;

correcting and linguistically normalizing terms or phrases within the search query; and using the linguistically normalized terms and phrases to process the transcript to assign ontology-based scores to terms or phrases in the transcript, wherein processing the transcript to assign ontology-based scores to terms or phrases further comprises:

preparing a list of term/ontology-metric pairs for each term or phrase in the linguistically normalized terms or phrases of the search query; and for each term or phrase in the transcript, associating a score with the term or phrase based on co-occurrence-metrics in the prepared lists of term/ontology-metric pairs by:

identifying each entry in each list of term/ontology-metric pairs in which the ontology that includes the currently considered term or phrase;

when two or more entries are identified, adding the co-occurrence metrics of the identified entries together and computing a score from the sum;

when one entry is identified, using the co-occurrence metric in the identified entry as the score; and associating the score with the currently considered term or phrase.

14. The computer-implemented method of claim 13 further comprising requesting a category ID and date or date/time indication that corresponds to the received content ID from a media-data-storage component of a content-search-service system.

15. The computer-implemented method of claim 14 further comprising requesting an ontology and vocabulary from an ontology-store component of the content-search-service system, using the category ID and date or date/time indication and requesting a transcript from an extracted-content-storage component of the content-search-service system using the received content ID.

16. The computer-implemented method of claim 13 wherein correcting and linguistically normalizing terms or phrases within the search query further comprises:

applying language rules and dictionary-based routines to the terms or phrases within the search query to correct spellings of any misspelled terms in the search query;

applying language routines to normalize the terms or phrases within the received search query by changing plural forms to corresponding singular forms and replacing derivative terms with root forms of the derivative terms; and filtering from the search query terms that do not occur in the received vocabulary.

17. A non-transitory machine-readable storage media having a set of instructions for searching for, and identifying, points in a transcribed media-content item related to a search query, the instructions, when executed by at least one machine, cause the at least one machine to:

receive, as input, a content ID and search query, wherein the content ID uniquely identifies a particular content item;

use the content ID to retrieve a category ID, ontology, vocabulary, and a transcript, wherein:

the category ID relates to a subject matter of the content item, and the transcript includes a textual rendering of an audio track of the content item;

correct and linguistically normalize terms or phrases within the search query; and use the linguistically normalized terms and phrases to process the transcript to assign ontology-based scores to terms or phrases in the transcript, wherein processing the transcript to assign ontology-based scores to terms or phrases further comprises:

preparing a list of term/ontology-metric pairs for each term or phrase in the linguistically normalized terms or phrases of the search query by:

identifying each entry in the ontology that includes the term or phrase paired with a second term; and for each identified entry, computing a co-occurrence metric as a combination of the co-occurrence values in the identified entry, and adding an entry to the list that includes the second term and the computed co-occurrence metric; and adding an entry to the list that includes the term and a identical-term co-occurrence metric; and for each term or phrase in the transcript, associating a score with the term or phrase based on co-occurrence-metrics in the prepared lists of term/ontology-metric pairs.

18. The non-transitory machine-readable storage media of claim 17 having additional instructions for requesting a category ID and date or date/time indication that corresponds to the received content ID from a media-data-storage component of a content-search-service system.

19. The non-transitory machine-readable storage media of claim 18 having additional instructions for requesting an ontology and vocabulary from an ontology-store component of the content-search-service system, using the category ID and date or date/time indication and requesting a transcript from an extracted-content-storage component of the content-search-service system using the received content ID.

20. The non-transitory machine-readable storage media of claim 17 wherein correcting and linguistically normalizing terms or phrases within the search query further comprises:

applying language rules and dictionary-based routines to the terms or phrases within the search query to correct spellings of any misspelled terms in the search query;

applying language routines to normalize the terms or phrases within the received search query by changing plural forms to corresponding singular forms and replacing derivative terms with root forms of the derivative terms; and filtering from the search query terms that do not occur in the received vocabulary.

* * * * *